April 21, 1936.  W. J. PETERS  2,038,057
SPRING CAP FOR COLLAPSIBLE TUBES
Filed June 6, 1935  2 Sheets-Sheet 1
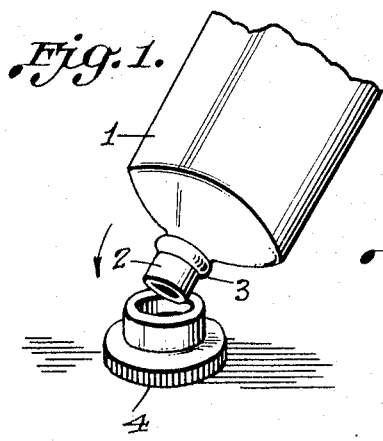
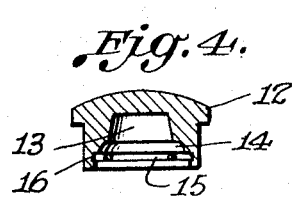
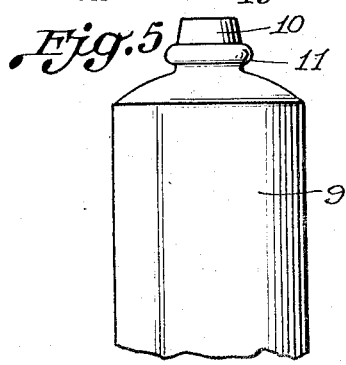
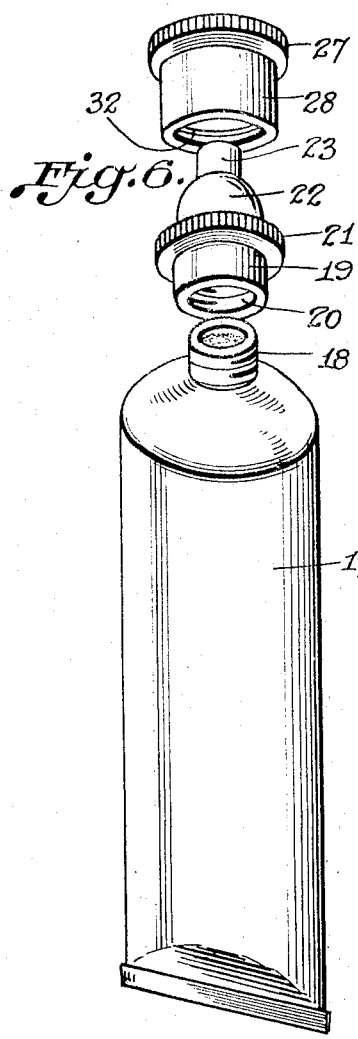
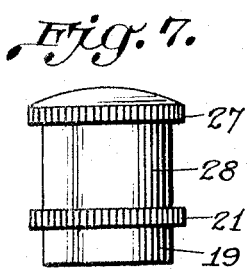
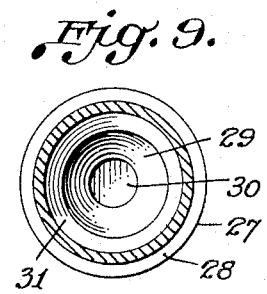
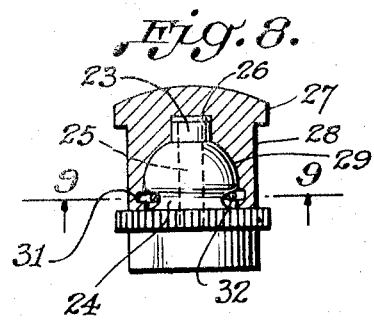
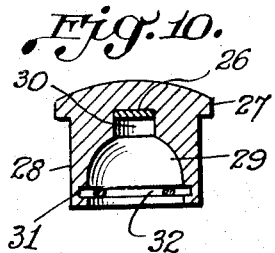
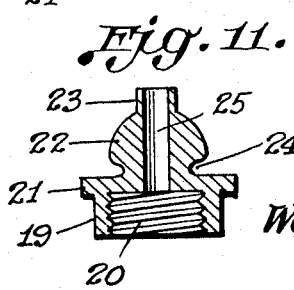
Inventor
Walter John Peters
By Lester L. Sargent
Attorney April 21, 1936. W. J. PETERS 2,038,057
SPRING CAP FOR COLLAPSIBLE TUBES
Filed June 6, 1935 2 Sheets-Sheet 2
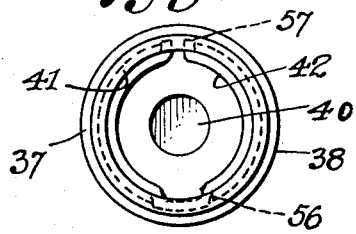
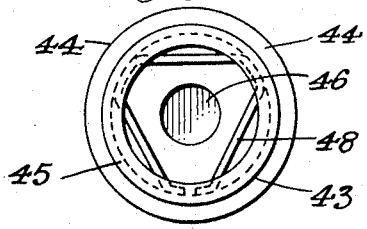
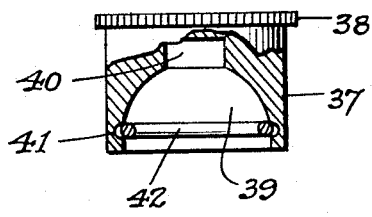
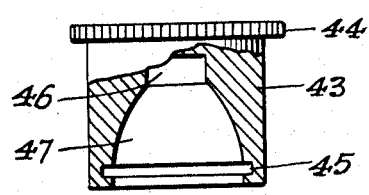
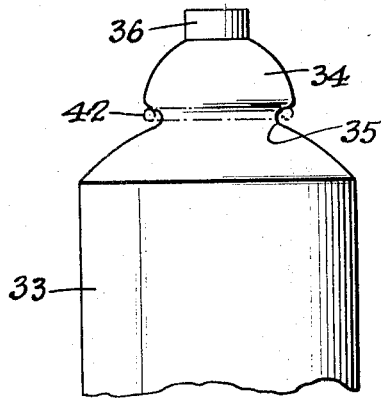
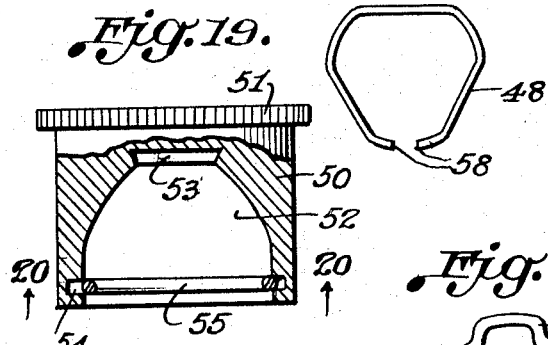
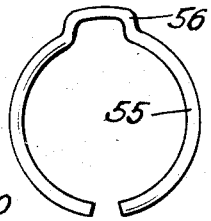
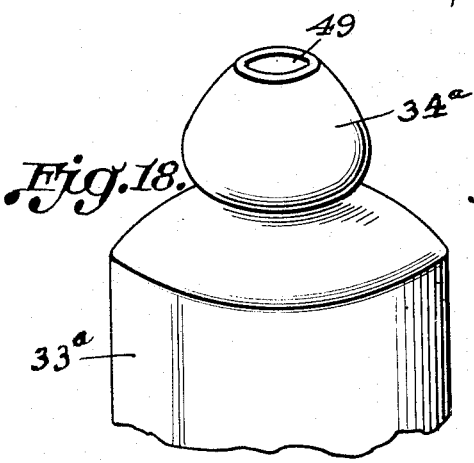
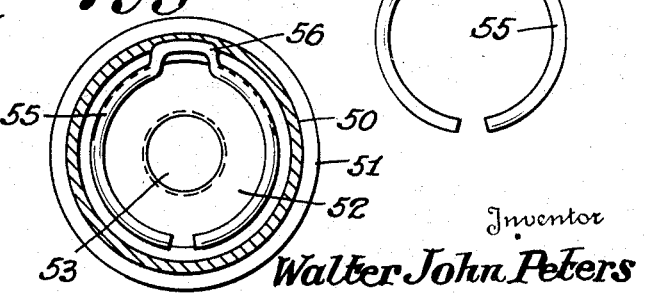
Inventor
Walter John Peters
By Lester L. Sargent
Attorney Patented Apr. 21, 1936

2,038,057

UNITED STATES PATENT OFFICE 2,038,057

SPRING CAP FOR COLLAPSIBLE TUBES

Walter John Peters, Suisun City, Calif.

Application June 6, 1935, Serial No. 25,321

4 Claims. (Cl. 221—60)

The object of my invention is to provide novel spring caps which can be quickly and easily applied to and removed from collapsible tubes, and which can be manufactured at a small cost. It is also an object of my invention to provide an adapter which can be attached to a collapsible tube which has a conventional threaded nozzle and on which adapter a spring cap may be applied. I attain these and other objects of my invention by the mechanism illustrated in the accompanying drawings, in which—

Figure 1 is a perspective view of a simple and efficient form of spring cap, and the tube to which it is applied;

Fig. 2 is a vertical section through the same cap;

Fig. 3 is a side elevation of the tube shown in Fig. 1;

Fig. 4 is a vertical section through a slightly modified form of cap;

Fig. 5 is a side elevation of a tube having a slightly modified form of cap;

Fig. 6 is a perspective view of a conventional tube having a screw top with the adapter which I have devised ready for application to it and with the spring cap which seats on the adapter shown above the adapter but detached from it;

Fig. 7 is a side elevation of the cap and adapter engaged to each other but removed from the tube;

Fig. 8 is a vertical section through the cap on the adapter shown in Figs. 6 and 7, but with the adapter in side elevation;

Fig. 9 is a section on line 9—9 of Fig. 8;

Fig. 10 is a vertical section through the cap by itself;

Fig. 11 is a vertical section through the adapter by itself;

Fig. 12 is a bottom plan view of a modified form of my spring cap;

Fig. 13 is a view partly in section and partly in elevation of the cap shown in Fig. 12;

Fig. 14 is a side elevation of a tube having a top suitably shaped for the cap shown in Figs. 12 and 13;

Fig. 15 is a bottom plan view of a cap having a spring of modified shape;

Fig. 16 is a view partly in section and partly in side elevation of the cap shown in Fig. 15;

Fig. 17 is a detail view of the spring 48 used in the cap illustrated in Figs. 15 and 16;

Fig. 18 is a perspective view of a collapsible tube with a modified shape of nozzle for the type of cap shown in Figs. 19 and 20;

Fig. 19 is a view partly in section and partly in side elevation of the original form of spring cap;

Fig. 20 is a bottom plan view of the cap shown in Fig. 19; and

Fig. 21 is a detail view of the spring used in the cap shown in Fig. 20.

Like numerals designate like parts in different views of the same form of cap but a different set of numerals is applied to different forms of the invention.

Referring to Figs. 1, 2, and 3 of the drawings, there is illustrated a collapsible tube 1 having a neck 2 and annular collar 3. The cap 4 has a chamber 5 having an enlarged mouth 6 and an annular inner groove 8 in portion 6 to receive the flexible split ring 7, which functions as a spring element to engage the collar 3 of the neck 2 of the tube.

Referring to Figs. 4 and 5, there is illustrated a tube 9 having a tapered neck 10 and annular collar 11. Cap 12 has a chamber 13 tapered to correspond with the shape of the neck 10 and with an enlarged mouth 14 in which is the annular groove 16 to receive the split ring 15.

Referring to Figs. 6 to 11, inclusive, there is illustrated a conventional collapsible tube 17 having a threaded neck 18. In place of the usual threaded cap, I provide an adapter 19 having an annular knurled portion 21 and having a threaded chamber 20 to engage the threaded neck 18, the collapsible dome-like nipple 22 terminating in the neck 23. At the base of the nipple 22 is an annular groove 24. Extending through the adapter is a channel 25. I provide a cap 28 having its chambered portion 29 shaped to correspond with the shape of the nipple 22 and chamber extension 30 corresponding with neck 23 and carrying a disc of cork 26 to seal the discharge channel 25 when the cap is applied. Cap 28 has an annular knurled portion 27, preferably at or near its top, and an annular interior groove 31 in which is seated a suitable split ring 32, as shown in Figs. 8 and 10.

The purpose of this adapter is to permit it to be attached to the type of collapsible tube now in general use having a threaded neck. On the adapter may be placed the spring cap which I have devised, to seal the tube.

Referring to Figs. 12 to 14 inclusive, there is illustrated a collapsible tube 33 which I have devised having a nipple 34 terminating in a cylindrical neck 36 and having an annular groove 35 at the base of the nipple. I provide a cap 37 of similar shape interiorly and having a knurled portion 38, preferably annular and preferably disposed at or near the top, to facilitate removal of the cap. The cap has a chamber 39 corresponding in shape to the nipple 34 and with a cylindrical end chamber 40 corresponding in shape with the neck 36 of the collapsible tube. The chamber 39 has an annular groove 41 to receive the split ring 42. Split ring 42 has an outwardly offset portion 56 at about the middle of the ring and outturned ends 57, which members seat in the annular groove 41 The ends 57 are spaced apart and the construction of the ring is such as to permit of free movement of the ring at its ends, the ring being moulded in the cap or fastened solidly in some manner at the portion 56. The spring is made of piano wire or some similar material that will spread out as it passes over the widest part of the nipple, the tension of the spring holding the cap on. When the cap is on, the spring encircles the nipple at the base.

Referring to Figs. 15 to 17 inclusive, there is illustrated a cap 43 for a tube of the type shown in Fig. 14 and having a suitable chamber 47 and end chamber 46 to seat over the nipple 34 and neck 36 of the collapsible tube. The cap has a knurled portion 44 and an annular groove 45 to receive a ring 48 of the type shown in Fig. 17. This ring is approximately hexagonal and split at 58.

Referring to Figs. 18–21 inclusive, there is illustrated a modified form of collapsible tube 33a having a nipple 34a with a mouth 49. I provide a cap 50 having a chamber 52 corresponding in shape with the nipple 34a and with an extension chamber 53 to receive a disc of cork which functions as a sealing element. Cap 50 has a knurled portion 51 and its chamber 52 has an annular groove 54 to receive the split ring 55. As shown in Figs. 20 and 21, this split ring has an offset portion 56 which functions to prevent removal of the cap from the nipple in any way other than a straight pull.

It will be noted that in each form the chambered portion of the cap corresponds substantially in shape with the shape of the exterior portion of the nipple or neck of the collapsible tube to which it is applied, and that in each instance there is an annular grooved portion of the collapsible tube (or in the case of Figs. 6 to 11 inclusive of the adapter) to be engaged by the split ring which is mounted in the annular groove within the cap. This construction makes it possible to apply the cap by merely pushing it onto the nipple or neck of the collapsible tube, or to remove it by merely giving a straight pull on the cap. The split ring mounted in the groove of the cap is made of piano wire or some material sufficiently flexible to spread out as a passage over the widest part of the nipple, and the tension of the spring encircling the recessed portion below the nipple or collar or grooved neck of the tube resiliently fastens the cap to the collapsible tube. The cap can be placed on the top with one hand by merely resting the cap with the open end facing up on any flat surface and pushing the nipple of the tube down into the cap, which will then snap into place on the neck of the collapsible tube (or in case of the form of the invention shown in Figs. 6 to 11, onto the nipple of the adapter 19, which in turn is threaded on the neck of a conventional collapsible tube such as shown in Fig. 6).

What I claim is:—

1. A collapsible tube having a dome-shaped channeled nipple, said nipple having a cylindrical neck portion at its apex, and having an annularly grooved portion at the base of the nipple, and a snap-on cap having a dome-shaped chamber, said chamber having a cylindrical extension chamber conforming in shape with the shape of the aforesaid nipple and neck of the collapsible tube, and having an annular recess in said cap, and a split ring mounted in said recess and adapted to engage around the annular grooved base of the nipple.

2. In combination with the tube defined in claim 1, the chambered portion of the snap-on cap having its cylindrical extension of sufficient length to receive a cork sealing disc at the end of the cylindrical neck portion of the nipple.

3. A collapsible tube having a dome-like nipple and having an annular grooved portion at the base of the nipple, a snap-on cap having a chambered portion shaped to correspond with the shape of the nipple of the collapsible tube and having an annular groove in said cap, having a split substantially hexagonal ring mounted in said annular groove and releasably engageable around the base of the nipple of the tube, the nipple having a cylindrical extended neck, and the cap having a cylindrical extended chamber to receive said neck whereby the snap-on cap will have to be pulled off with a straight pull.

4. A collapsible tube having a dome-like nipple and an annularly grooved portion at the base of said nipple, a snap-on cap having a correspondingly shaped chamber, an annular groove in the chambered portion of the cap, a split ring mounted in said groove and adapted to engage the grooved portion at the base of the nipple of the collapsible tube when the cap is applied, said ring having an offset portion at about the middle of the ring moulded solidly in the ring at this portion, the ends of the ring being spaced apart and outturned substantially as shown.

WALTER JOHN PETERS.